March 24, 1970
J. H. PERRY
3,502,194
CONVEYOR SYSTEM
Filed May 27, 1968
7 Sheets-Sheet 1
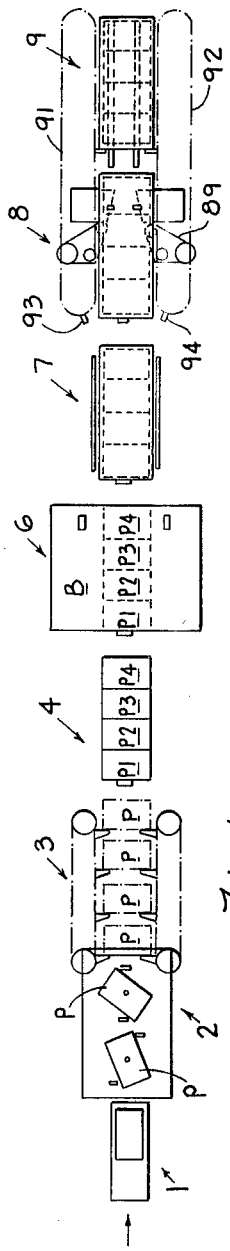
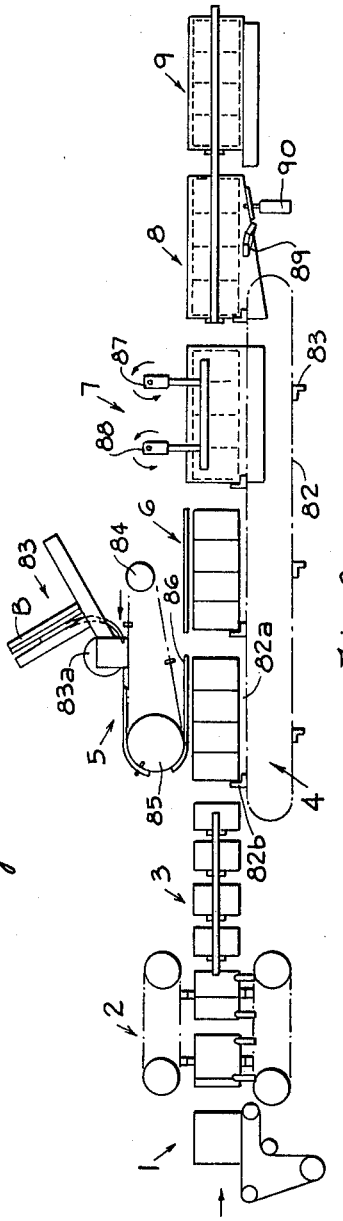
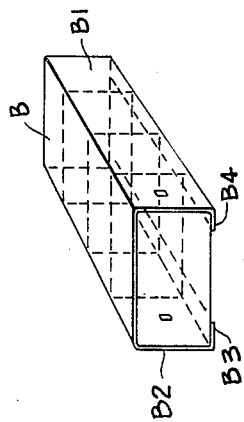
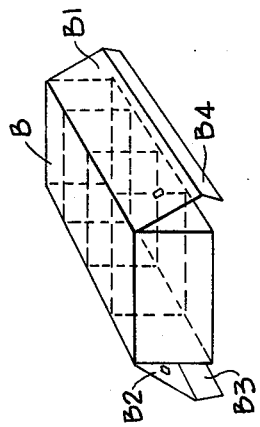
INVENTOR.
JOHN H. PERRY
BY *Walter M. Rodgers*
ATTORNEY March 24, 1970    J. H. PERRY    3,502,194
CONVEYOR SYSTEM
Filed May 27, 1968    7 Sheets-Sheet 2

INVENTOR.
JOHN H. PERRY
BY Walter M. Rodgers
ATTORNEY

INVENTOR.
JOHN H. PERRY
BY Walter M. Rodgers
ATTORNEY

March 24, 1970     J. H. PERRY     3,502,194
CONVEYOR SYSTEM

Filed May 27, 1968             7 Sheets-Sheet 7

INVENTOR.
JOHN H. PERRY
BY *Walter M. Rodgers*

ATTORNEY

United States Patent Office 3,502,194
Patented Mar. 24, 1970

3,502,194
CONVEYOR SYSTEM
John H. Perry, Doraville, Ga., assignor to The Mead
Corporation, a corporation of Ohio
Filed May 27, 1968, Ser. No. 732,465
Int. Cl. B65g 47/24
U.S. Cl. 198—33         11 Claims

ABSTRACT OF THE DISCLOSURE

A conveyor system for use in conjunction with a packaging operation receives in sequence a plurality of articles each of which may consist of a plurality of primary packages disposed within a wrapper. Each article is received first by accelerator means which increases its velocity along a predetermined path. The article is thereafter received by an orienting mechanism which simultaneously imparts longitudinal movement to the article while imparting rotary movement thereto about a vertical axis, such rotary movement being imparted to each article by transversely reciprocable pusher means. Transport means moving at a velocity less than the horizontal time rate of movement of the orienting means receives in sequence each article and imparts movement thereto along the predetermined path, the articles being in spaced relation to each other along the path of movement. An accumulator receives the articles from the transporter means and arranges the articles in close juxtaposition to each other. Thereafter as the articles so arranged in close proximity to each other are passed underneath a blank feeder element, a wrapper blank is placed atop the articles and means are provided thereafter for folding the sides and bottom panels of the wrapper and for gluing the bottom panels of the wrapper to the articles.

---

Consumer products packaged in primary packages ordinarily are shipped from the producer to the ultimate consumer in containers of corrugated paperboard. The primary packages may be separated from each other by suitable spacers or such spacers may not be used if not required to protect the primary packages.

Where open ended sleeve type wrappers are used to envelope a plurality of primary packages, it sometimes is the practice to ship a number of such articles in a single corrugated case. Such packaging is expensive and requires a substantial amount of paperboard.

According to this invention, a plurality of articles are mounted within a single wrapper blank disposed about the articles and secured thereto. Such packages may be formed of light weight paperboard by machine operations according to this invention and substantial economies thereby effected.

According to this invention in its broader aspects, a conveyor system is provided in which accelerator means is employed for receiving an article and such accelerator means effects movement thereof at a velocity greater than the velocity of the article as it arrives from the packaging machine. Orienting means receives the article in sequence from the accelerating means and rotates each article about a vertical axis for approximately 90° and supplies the reoriented article to a transporter which in turn imparts movement thereto at a particular instant so as to avoid collision between adjacent articles during the rotating movement thereof. Thereafter an accumulator receives the articles from the transporter and causes the articles to move into close proximity to each other. A wrapper blank is then withdrawn from a hopper and wrapped about each article and secured thereto by a suitable application of glue.

While the invention is well adapted for applying a blank to a plurality of secondary packages herein referred to as articles, the invention is also well suited for applying a blank to a primary package as well and both such packages are contemplated by the term "article."

Figure 5:
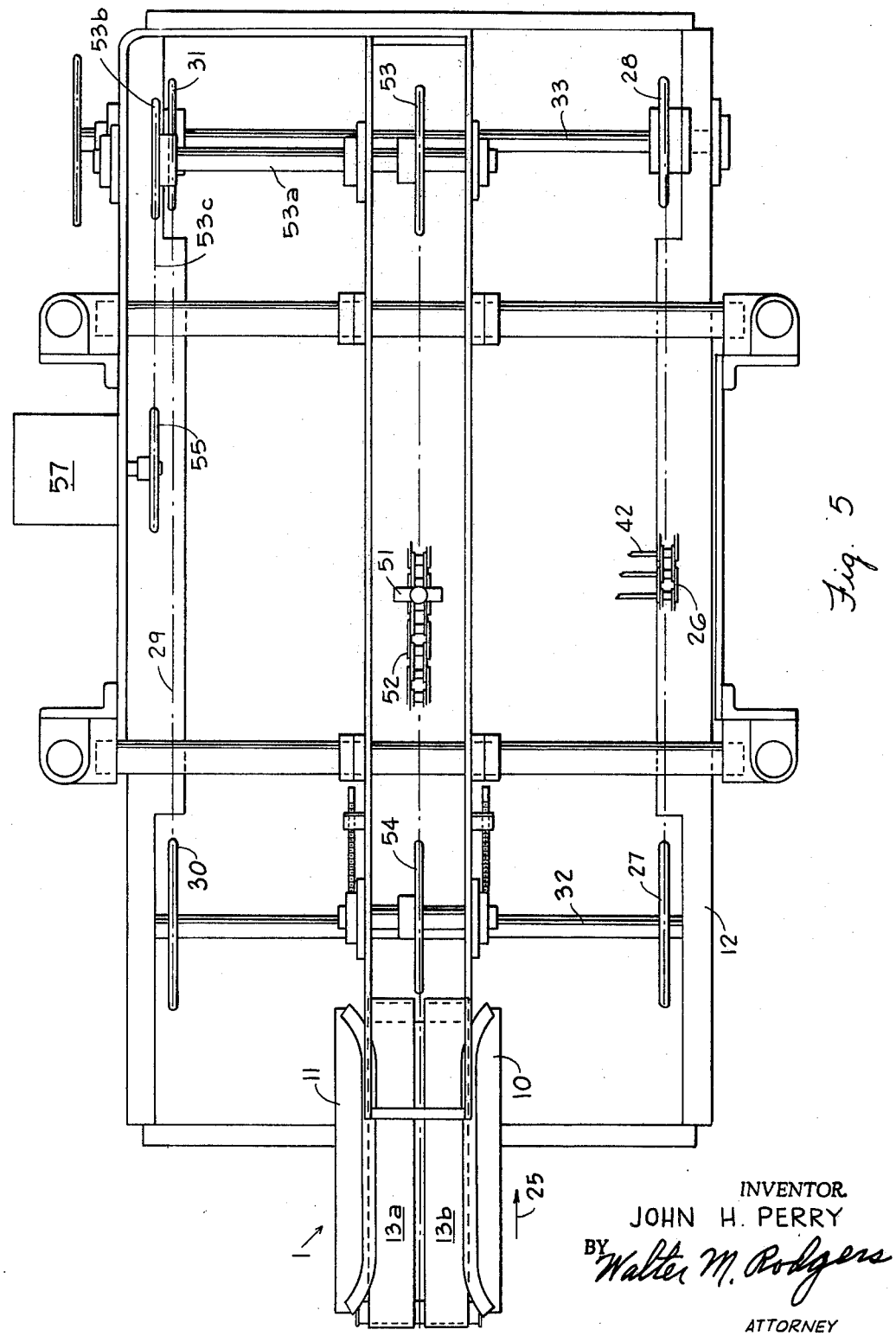
Figure 6:
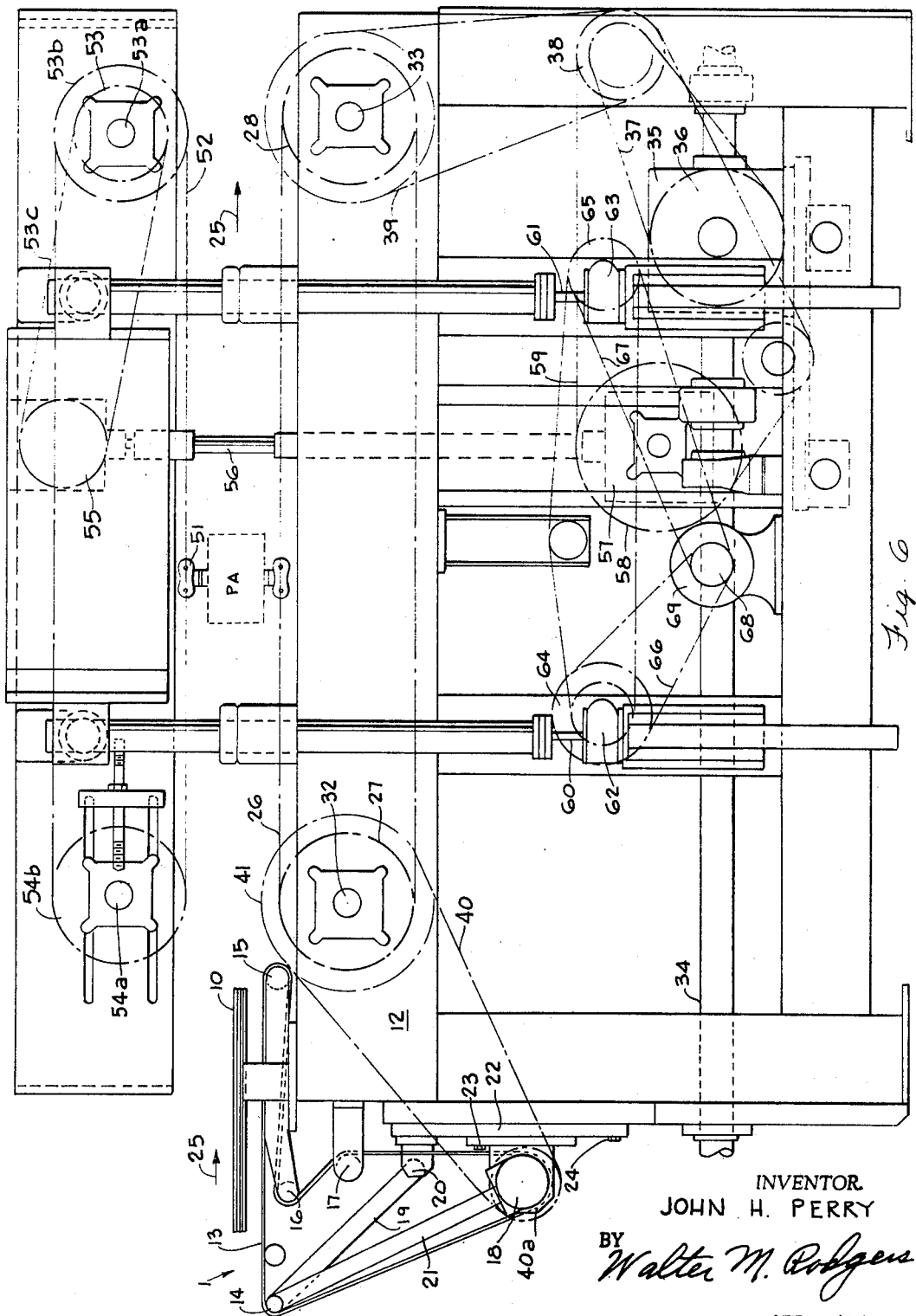
Figure 7:
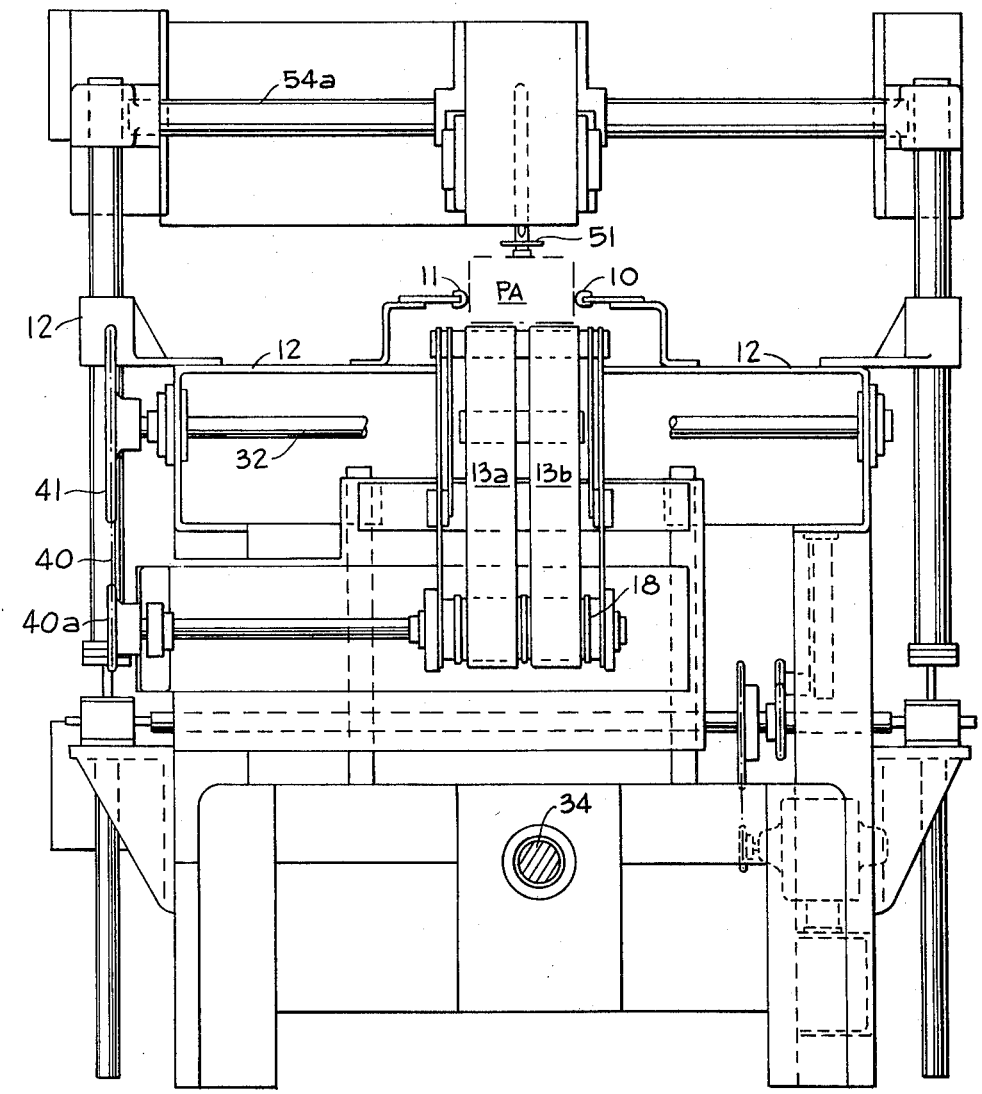
Figure 8:
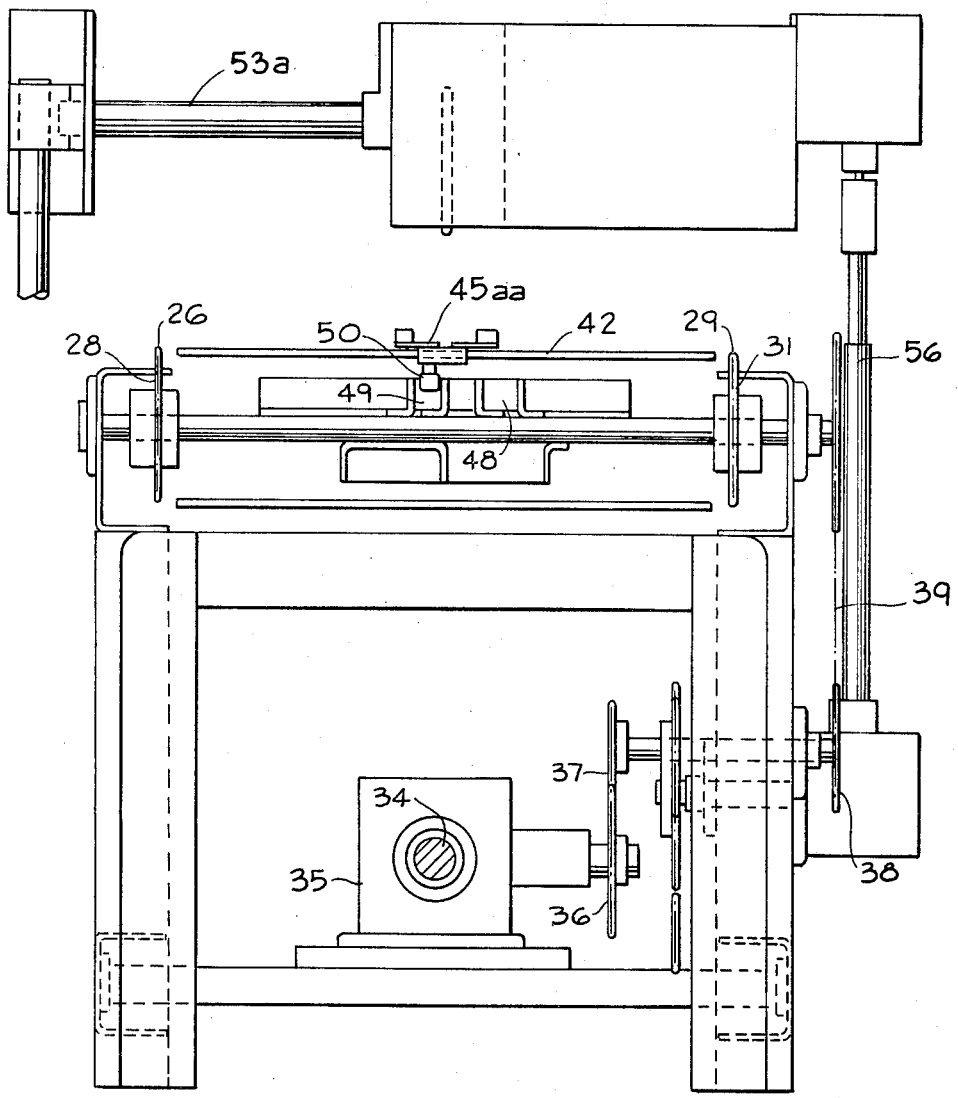
Figure 9:
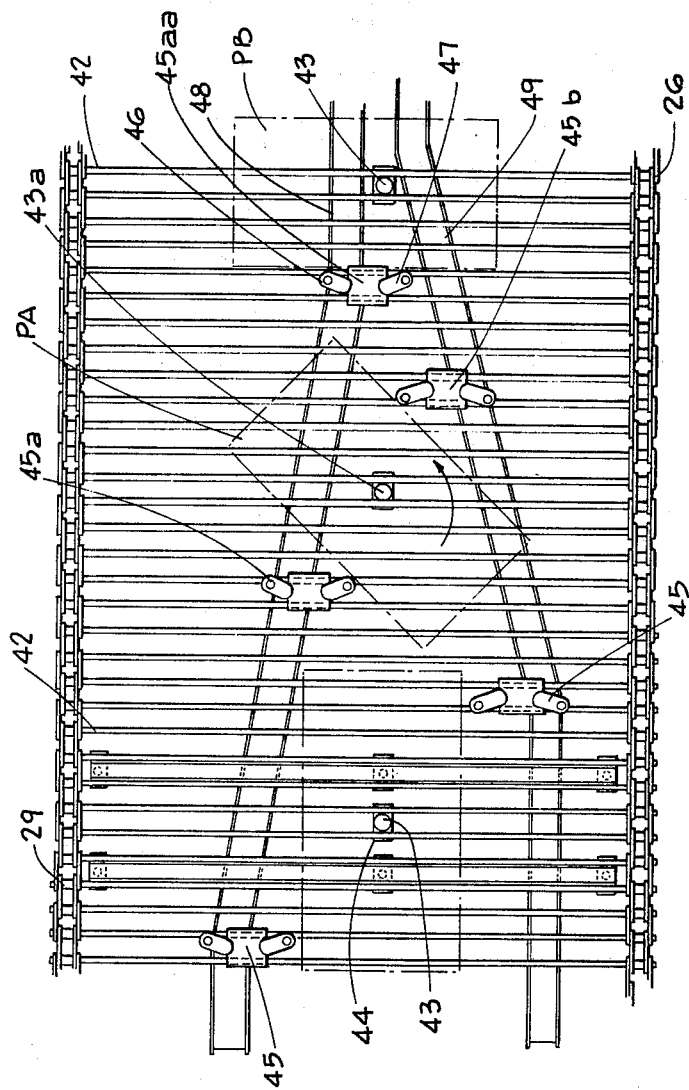
Figure 10:
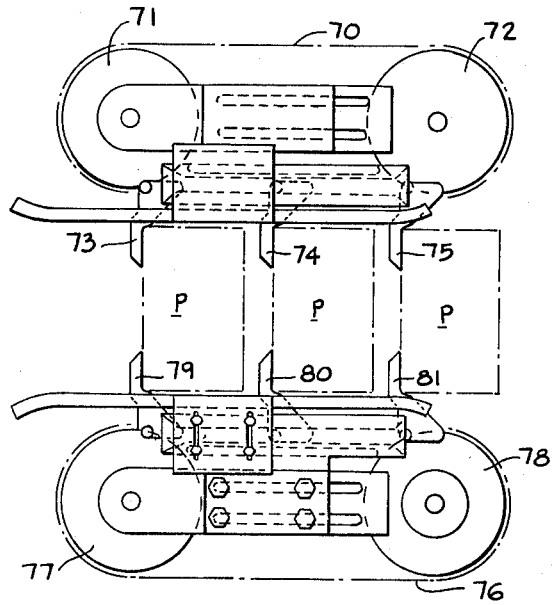
Figure 11:
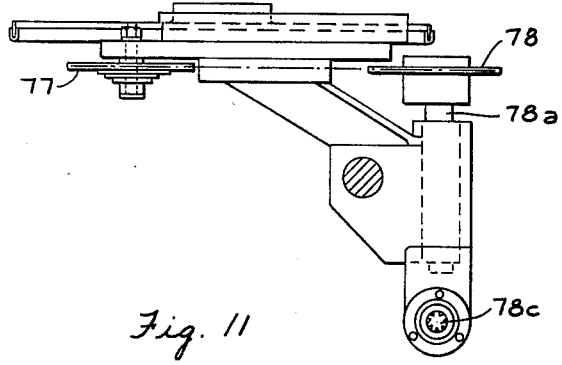
Figure 12:
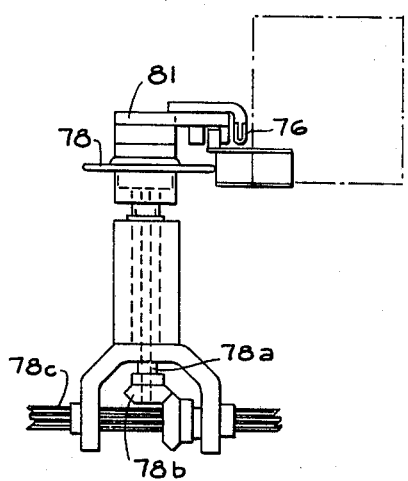

For a better understanding of the invention, reference may be had to the following detailed description taken in conjunction with the accompanying drawings in which FIG. 1 is a schematic plan view of a machine and system constructed according to this invention; FIG. 2 is a side view of the arrangement depicted in FIG. 1; FIG. 3 is a perspective view of a blank which is applied to a plurality of articles according to this invention and shows the blank in a partially folded condition; FIG. 4 is a perspective view of a completed assembly formed from the blank of FIG. 3 and including four secondary packages or groups of primary packages; FIG. 5 is an enlarged plan view of a portion of the arrangement depicted in FIG. 1 and showing the accelerator and the orienting means; FIG. 6 is a side view of the arrangement depicted in FIG. 5; FIG. 7 is an end view from the left end of the mechanism depicted in FIGS. 5 and 6; FIG. 8 is an end view taken from the right hand end of the mechanism depicted in FIGS. 5 and 6; FIG. 9 is an enlarged plan view of a portion of the mechanism depicted in FIG. 5; FIG. 10 is a plan view of the transporter part of the system depicted in FIG. 1; FIG. 11 is a front elevation view of the arrangement shown in FIG. 12 and in which FIG. 12 is an end view of a portion of the mechanism depicted in FIGS. 10 and 11.

In the drawings, the numeral 1 generally designates the accelerator whereby articles arriving from a packaging machine are received and accelerated. The numeral 2 generally designates the orienting mechanism while the numeral 3 generally designates the transporter. The accumulator is generally designated by the numeral 4 and the paper feed mechanism is generally designated by the numeral 5. An intermediate stage of the procedure is designated by the numeral 6 during which a blank B is disposed atop the articles in the form of secondary packages P1, P2, P3 and P4.

After the wrapper blank B is deposited atop the articles, the sides of the blank are folded downwardly. This operation is accomplished at the folding station generally designated by the numeral 7 where side folders perform the necessary operations on side panels B1 and B2. Thereafter the bottom panels B3 and B4 of the blank are folded underneath the articles and glued thereto at the station generally designated by the numeral 8. Following this folding and gluing operation, the assembled unit as depicted in FIG. 4 is passed through the glue hardening and pressure stage generally designated by the numeral 9. For a more complete disclosure respecting the assembly of a blank such as B and its relationship to the articles enveloped thereby reference may be had to U.S. Patent 3,071,244.

The accelerating stage as best shown in FIGS. 5 and 6 comprises a pair of spaced guides 10 and 11 mounted to the frame 12 of the machine and disposed on opposite sides of an endless belt 13 trained about rollers 14, 15, 16, 17 and 18. Roller 14 is supported by angularly disposed brace 19 pivotally mounted at 20 and by brace 21. Pivot 20 is on a slidable block 22. Block 22 may be moved up and down and is secured to the frame of the machine by a plurality of bolts 23 and 24. By this means, the tension of belt 13 may be adjusted. In addition the elevation of the left hand end of conveyor belt 13 may be adjusted by the vertically slidable block 22 and parts associated therewith.

Conveyor belt 13 is arranged to impart movement to the incoming articles at a velocity which is greater than that at which the articles are received from the packaging machine. Of course movement of the articles is from left to right as indicated by the arrow 25. As is best shown in FIG. 5, the conveyor 13 is of dual construction comprising the parts 13a and 13b.

After the articles P leave the accelerator belt 13 they are supplied to the orienting device generally designated by the numeral 2. During this operation the articles P continually move from left to right and are rotated approximately 90° about a vertical center line. To this end and as is best shown in FIGS. 5, 6 and 9, a first conveyor comprises an endless chain 26 which is mounted on sprockets 27 and 28 together with a second endless chain 29 mounted on sprockets 30 and 31. Of course sprockets 27, 28, 30 and 31 are suitably mounted on shafts 32 and 33. Chains 26 and 29 are driven from the main longitudinally disposed drive shaft 34 which runs throughout the length of the machine and which is journalled thereon in suitable bearings. Main shaft 34 drives mechanism housed within gear box 35 and through sprocket 36, chain 37, sprocket 38 and chain 39 imparts rotary movement to sprocket 28 and shaft 33. Chain 26 drives sprocket 27 and shaft 32 from sprocket 28. Rotary movement is imparted to accelerator belt 13 by chain 40 and sprocket 40a is driven by sprocket 41 mounted on shaft 32.

The first conveyor means comprising chains 26 and 29 incorporates a plurality of transversely disposed elongated elements designated by the numeral 42. Pedestals 43 are mounted on plates 44 secured at intervals to elongated elements 42. Pedestals 43 are rotatable about a vertical axis which is normal to the working reach of the first conveyor and are provided with top article engaging surfaces which are movable in a plane parallel to the plane of movement of the working reach of the conveyor.

In order to impart angular motion to the articles P, a plurality of pusher elements 45 are slidably mounted on elongated transversely disposed elements 42. As viewed in FIG. 9, movement downwardly by the pusher element 45a together with upward movement of pusher element 45b results in angular motion of article PA in a counter-clockwise direction about the pedestal 43a. After sufficient motion occurs, the article occupies the position designated at PB. When in this position, the transversely disposed finger portions 46 and 47 of pusher element 45aa serve to maintain the orientation of article PB as shown in FIG. 9.

Transverse motion is imparted to the pusher elements 45 by guides designated by the numerals 48 and 49 which engage cams affixed to the bottom of pusher elements 45 and which extend downwardly as designated by the numeral 50 in FIG. 8. Thus as motion of the articles proceeds from left to right as viewed for example in FIGS. 5, 6 and 9, the pusher elements swing the articles to the position depicted at PB in FIG. 9.

It is apparent from FIG. 9 that the pushers 45 are spaced apart in the longitudinal direction of bodily movement of the articles by a distance corresponding to the width of the articles so that after the angular or rotating movement is completed adjacent pushers such as 45a and 45b are in steadying engagement with the trailing and leading walls of an article. Furthermore since the width of articles may vary requiring machine adjustment and since the spacing between rods 42 is fixed, it is desirable that the transversely disposed finger portions 46 and 47 be adjustable relative to their associated one of the pushers 45 and such adjustment is deemed to constitute a facet of the invention.

Thereafter the articles are transported in spaced relation along the predetermined path of the packaging operation. This operation is effected by the transporter generally designated by the numeral 3.

After the articles are oriented as indicated in FIG. 9 at position PB, they must be moved away in such manner as to prevent collision between an article such as that located at PB and that which is being rotated as indicated at PA. To this end, the transporter mechanism of FIG. 10 is synchronized to take away each article at the proper time relative to the succeeding article.

In order to stabilize articles as they move through the orienting mechanism of the machine, stabilizing element 51 is rotatably mounted on endless chain 52 which is supported by sprockets 53b and 54b. Sprocket 53 is driven by shaft 53a, sprocket 53b and chain 53c which in turn is driven by sprocket 55. Sprocket 55 is operated through a system of miter gears from the shaft 56 which in turn is driven by miter gears from the gear box 57 driven by sprocket 58, chain 59 and sprocket 38. Thus as is best shown in FIG. 6, movement of the article PA from left to right is stabilized by the stabilizing element 51 which rests atop the article. Since stabilizing element 51 is rotatably mounted, it does not interfere with the angular movement of the article as best shown in FIG. 9.

In order to render the machine adaptable for use in conjunction with articles which are of different heights, the chain 52 and stabilizing element 51 together with parts associated therewith may be raised and lowered. This is accomplished by vertically adjustable screws 60 and 61 which are rotated by gears 62 and 63 driven by sprockets 64 and 65 which in turn are driven by chains 66 and 67 operated from sprockets 68 driven by a suitable air motor or other device 69.

After an article is rotated at the orienting station to occupy the position PB as indicated in FIG. 9, the article must be transported away at the proper time so as to prevent collision between the rotated article and the immediately succeeding article such as that designated at PA in FIG. 9 as explained. To this end, the transporter assembly 3 is employed and incorporates as is best shown in FIGS. 10, 11 and 12 an endless chain 70 mounted on sprockets 71 and 72 together with transversely disposed lugs such as 73, 74 and 75. Similarly on the other side of the machine, an endless chain 76 is mounted on sprockets 77 and 78 and lugs 79, 80 and 81 are employed to push the articles P from left to right in correct timed relationship to adjacent packages. Of course the chains 70 and 76 are driven by one of their associated sprockets from gearing mechanism coupled with main shaft 34 by mechanism 78a, 78b and 78c as shown in the drawings.

Once the articles complete movement in spaced relation through the transporter generally designated by the numeral 3, they are fed through the accumulator portion of the machine generally designated by the numeral 4. This portion of the machine constitutes a fixed plate 82a having a slot through which a lug 82b mounted on a chain 82 rides so that a frictional relationship between the fixed plate 82a causes the front one of a group of articles such as P4 to slow down and allows the succeeding article such as P3, P2 and P1 to come into close proximity therewith. Continued motion of an article such as is shown at the transporter station 4 in FIG. 1 results in movement of the article under the hopper 83 in which a plurality of blanks B are mounted. These are fed by known rotatable mechanisms 83A to a feeder conveyor 84 which first moves the blanks toward the left and then toward the right as they round the roller 85. Thereafter the blanks are deposited atop the articles as is indicated at 86.

When the article and its associated wrapper arrive at the folding station 7, rotatable devices 87 and 88 engage the side panels B1 and B2 of the wrapper and force those panels downwardly. Thereafter a suitable twisted belt structure generally designated at 89 engages the bottom panels B3 and B4 of the blank and holds these panels between suitable guides while an application of glue is made by a glue nozzle 90 to the inner surface of the panels B3 asd B4. After the glue is applied, the bottom panels B3 and B4 are folded into flat face contacting relationship with the bottom of the article P and the resulting assembly is passed toward the right under the influence of lug chains 91 and 92 on which a plurality of lugs 93 and 94 are mounted. Pressure is applied to the article at glue hardening station 9 and the completed package is then discharged from the right hand end of the machine.

The embodiments of the invention in which an exclusive property or privilege is claimed are defined as follows:

1. A conveyor system comprising a first endless conveyor having a working reach movable along a predetermined path, a pedestal mounted on said conveyor and having a support surface freely rotatable in a plane substantially parallel to the working reach of the conveyor, and pusher means transversely movable relative to said conveyor along a path spaced from the axis of rotation of said pedestal, said pusher means being engageable with an article positioned on said support surface to impart rotary movement thereto relative to said conveyor.

2. A conveyor system according to claim 1 wherein said conveyor comprises a pair of horizontally spaced endless elements interconnected by a plurality of longitudinally spaced elongated elements and wherein said pusher means is slidably mounted on said elongated elements.

3. A conveyor system according to claim 2 wherein fixed cam means is arranged to engage a part of said pusher means to impart transverse movement thereto.

4. A conveyor system according to claim 1 wherein a second conveyor is disposed above said first conveyor with the working reach of said second conveyor arranged in spaced generally parallel relation with respect to the working reach of said first conveyor and wherein a stabilizing element is rotatably mounted on said second conveyor, rotation of said stabilizing element normally being about an axis which is normal to the working reach of said second conveyor.

5. A conveyor system according to claim 4 wherein said conveyors are relatively movable vertically so as to vary the spacing between the working reaches thereof.

6. A conveyor system according to claim 1 wherein said pusher means is provided with transversely disposed article engaging means for engaging and holding an article in a predetermined orientation relative to the path of movement of the working reach of said first conveyor.

7. A conveyor system according to claim 6 wherein said article engaging means comprises a pair of spaced article engaging finger portions adjustably mounted on said pusher means.

8. A conveyor system according to claim 1 wherein a pair of pushers engage leading and trailing portions of the article at points on opposite sides thereof which are in front of and behind said pedestal respectively with reference to the direction of travel of the working reach of said first conveyor.

9. A conveyor system according to claim 8 wherein said pushers are spaced apart in the direction of travel of the conveyor working reach by a distance corresponding to the width of the article so that after angular movement is imparted to an article said pushers engage the leading and trailing walls thereof respectively.

10. A conveyor system comprising acceleration means for receiving an article moving at a predetermined velocity along a predetermined path and for increasing the time rate of movement thereof, orienting means for receiving the article from said acceleration means and for reducing the velocity of movement thereof along said predetermined path and for imparting angular bodily movement to the article relative to said predetermined path, and transporter means for receiving the article from said orienting means and for imparting movement thereto along said predetermined path at a velocity such that movement imparted to the article along said path by said orienting means is at such velocity so as to prevent collision between the article and a succeeding article due to rotary movement imparted to said succeeding article by said orienting means.

11. A conveyor system according to claim 8 wherein accumulator means is arranged to receive articles from said transporter means in spaced relation relative to said path of movement and wherein said accumulator means assembles a plurality of articles in close proximity to each other while continuing movement thereof along said predetermined path.

References Cited

UNITED STATES PATENTS

| 2,669,342 | 2/1954 | Neal | 198—164 |
|---|---|---|---|
| 2,805,753 | 9/1957 | Palmer. | |

ANDRES H. NIELSEN, Primary Examiner